United States Patent [19]

Manabe et al.

[11] Patent Number: 5,337,351
[45] Date of Patent: Aug. 9, 1994

[54] FEATURE INTERACTION ARBITRATOR

[75] Inventors: Hisashi Manabe, Tokyo, Japan; Hideo Yabe, Irving, Tex.

[73] Assignee: NEC America, Inc., Melville, N.Y.

[21] Appl. No.: 843,366

[22] Filed: Feb. 28, 1992

[51] Int. Cl.⁵ .............................................. H04M 3/42
[52] U.S. Cl. ................... 379/201; 379/142; 379/215; 379/211
[58] Field of Search ............... 379/201–216, 379/142

[56] References Cited

U.S. PATENT DOCUMENTS

| | | |
|---|---|---|
| 4,611,094 | 9/1986 | Asmuth et al. |
| 4,695,977 | 9/1987 | Hansen et al. |
| 4,782,517 | 11/1988 | Bernardis et al. |
| 4,873,718 | 10/1989 | Barnett et al. |
| 4,878,240 | 10/1989 | Lin et al. |
| 4,893,335 | 1/1990 | Fuller et al. |
| 4,897,866 | 1/1990 | Majmudar et al. |
| 4,902,881 | 2/1990 | Janku |
| 4,905,274 | 2/1990 | Cooper et al. |
| 4,954,941 | 9/1990 | Redman |

FOREIGN PATENT DOCUMENTS 0350918  1/1990  European Pat. Off. ............ 379/211

OTHER PUBLICATIONS

Pinkham, "Intelligent Network Feature Transaction Interface", pp. 47–52, Dec. 1988.
Bauer et al., "Designing Service—Independent Capabilities for Intelligent Networks", pp. 31–44, Dec. 1988.
Homayoon et al., "Methods of Addressing the Interactions of Intelligent Network Services with Embedded Switch Services", IEEE 1988.
Bellcore Multi–Vendor Interactions Dec. 29, 1989.

*Primary Examiner*—James L. Dwyer
*Assistant Examiner*—Ahmad F. Matar
*Attorney, Agent, or Firm*—Sughrue, Mion, Zinn, Macpeak & Seas

[57] ABSTRACT

A Feature Interaction Arbitrator (FIA) for identifying the existence of interactions among various telephone call features (e.g., call forwarding busy line and call waiting) and for resolving these interactions. The FIA manages feature interactions in three phases to support a telephone switch as well as a vendor's software development process, the feature administrator of the telephone operating company, feature designer, and for the subscriber (end-user). The first phase is when the feature administrator assigns several features to a subscriber's line. The second phase is when a subscriber activates at least one of the features previously assigned to the subscriber's line. The third phase identifies and resolves feature interactions that occur during run-time operation. During the latter two phases, the FIA is located in the telephone switching system. The FIA provides a database which includes numerical data assigned to classes of feature elements which uniquely define the properties of each feature. When the FIA is invoked, logical and/or arithmetic operations (e.g., AND, exclusive-OR, multiplication, etc.) are variously performed at different stages on the numerical data. As a result, the identification of a feature interaction/conflict and the resolution of the same can be accomplished. Finally, a switching device is driven based on the result.

20 Claims, 10 Drawing Sheets

FEATURE INTERACTION ARBITRATOR

BACKGROUND OF THE INVENTION

The present invention relates, in general, to a telephone communication network and, more particularly, to a method and apparatus for managing/controlling feature interactions by analyzing the operation of one feature against another existing/executing feature during assignment, activation, and execution phases of a telephone communication network.

Contemporary telephone communication networks can provide well over 100 services or features, such as call forwarding, call waiting, call transfer, ring selection, speed calling, etc., to customers. Moreover, new features are continually being developed by the telephone operating companies in order to meet the needs of their telephone customers. U.S. Pat. No. 4,878,240 issued to Lin et al. and U.S. Pat. No. 4,905,274 issued to Cooper et al., for example, describe apparatus and methods which provide customers with the ability to select, activate/deactivate, and change such features to suit their needs. Now that the customer has the ability to customize their individual telephone system, there is a need greater than ever to manage and control the interaction of telephone features.

Feature interactions are defined as a contradiction or conflict among services when at least two features are provided simultaneously. The following examples illustrate the need to manage and control feature interactions. The telephone call feature of call waiting provides an indication (e.g., an audible tone) to a called party on a busy line that another party is attempting to reach him. This feature also permits the called party to switch between the two parties by flashing the switch hook on his telephone. Now, consider the telephone call feature of call forwarding busy line. This feature, when activated by the called party, forwards the second call to another predetermined telephone exchange. The interaction of these two features is, of course, whether the telephone switch should invoke the call waiting feature and interrupt the called party, or implement the call forwarding busy line feature and forward the second call to the predetermined telephone exchange.

A second example involves the telephone call feature of call forwarding. If a customer programs a first telephone to forward calls to a second telephone and programs the second telephone to forward all calls to the first telephone, then an unpredictable result occurs.

The foregoing examples, although rather simple, do provide a focus as to what the present invention seeks to accomplish, namely, how to manage and control the interaction of at least two features.

The inventors are aware of two approaches for identifying and resolving feature interactions. First, there is known a method of resolving feature interactions by executing predetermined scripts (i.e., program code) or referring to a predetermined decision table. This method is also referred to as a specific interaction-by-interaction method. This method relies on specifying each possible interaction for every possible combination of features and writing software or program code to manage accordingly. This method is disadvantageous, however, because as the number of features increase, the specification quickly becomes complex, that is, the decision logic increases in proportion to the square of the number of features to be served. Moreover, as new features are added to the telephone system, the many possible interactions must be determined (in advance, if even possible) and programmed into the telephone switch.

The second approach is to generalize the decision logic for resolving feature interactions. The goal of this approach is to eliminate the dependencies against the number of features to be served. Conceptually, this approach is better than the first approach because a decision of comparing the level of precedence defined among features is made which is effective for runtime processing.

This latter method, however, is disadvantageous because the data does not consist of any information defining the nature, characteristics, or properties of features, but simply consists of a feature precedence list for subscribers which are defined by the telephone operating company. As a result, feature interactions are resolved only by selecting the highest priority feature which is interested in a trigger point and event. Accordingly, this general method approach cannot provide the capability to check whether two specific features are in conflict

SUMMARY OF THE INVENTION

It is therefore an object of the present invention to provide a Feature Interaction Arbitrator (FIA) apparatus and method for identifying and resolving feature interactions which is free of the above-mentioned problems.

It is a further object of the present invention to provide a FIA having a small memory requirement for a large number of features and having the ability to easily incorporate new features into the network.

In accordance with the above and other objects, the present invention provides a method of managing feature interactions in a telephone switching system which is capable of implementing a plurality of features, the method including the steps of: A) defining classes of feature elements characteristic of properties of the features, B) assigning numerical values to the feature elements to uniquely define each feature, C) identifying an interaction between two features Y and X based on a comparison of the numerical values assigned to feature elements of the two features Y and X, the feature X being a feature sought to be activated by a primary user, and the feature Y being a feature already assigned to a subscriber, D) controlling, as the post-arbitration action, the switching device in response to the identifying step by implementing only an accepted feature to avoid the interaction between the two features Y and X.

Further, in accordance with the above objects, the present invention provides a feature interaction arbitrator for managing feature interactions in a telephone switching system which is capable of implementing a plurality of features, each of which are defined by classes of feature elements, wherein the arbitrator includes storage means for storing numerical values which have been assigned to the feature elements for each of the features, identification means for identifying an interaction between two features Y and X based on a comparison of the numerical values assigned to the feature elements of the feature Y with the numerical values assigned to the feature elements of the feature X, control means, responsive to an output of the identification means, for controlling the switching system so as to avoid the interaction between the two features Y and X.

Other features and advantages of the invention will be apparent from the following description of the preferred embodiments, and from the claims.

DESCRIPTION OF THE PREFERRED EMBODIMENTS

Referring to the accompanying drawings, preferred embodiments of the present invention will be described in detail. The Feature Interaction Arbitrator (FIA) provides a means for managing and controlling feature interactions in the switch as well as providing support for the vendor's software development process, the telephone operating company (TOC) administrator, feature designer, and for the subscriber (i.e., the end-user).

Figure 1A:
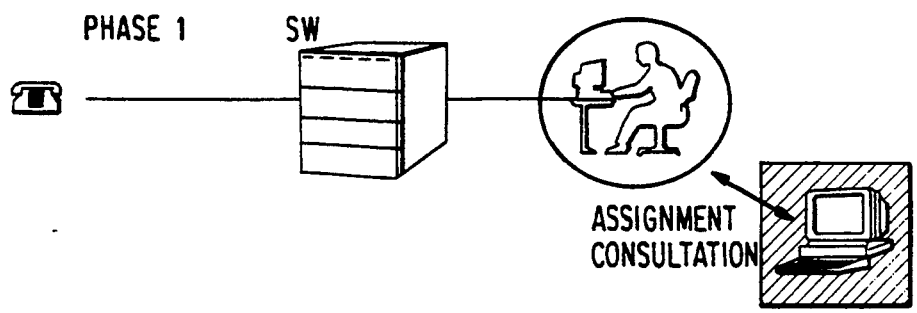
FIGS. 1A, 1B, and 1C illustrate three phases in which the Feature Interaction Arbitrator (FIA) applies.
Figure 1B:
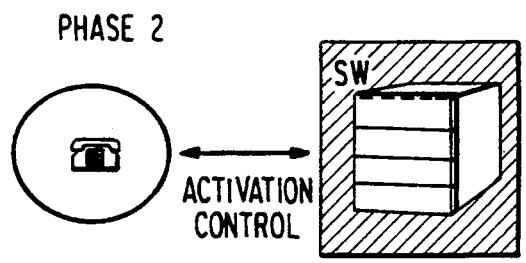
Figure 1C:
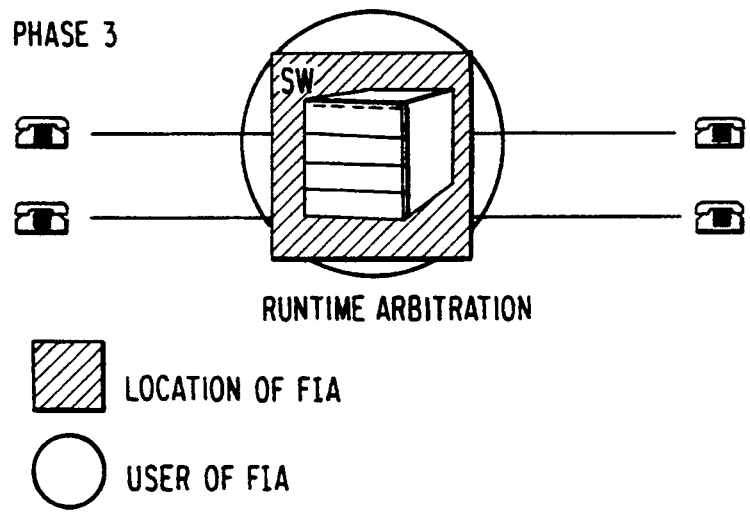

FIG. 1A, 1B, and 1C respectively illustrate three environments, identified as Phase 1, 2, and 3, in which the FIA is utilized by one of three users, who seek to first identify feature interactions and second to arbitrate or resolve the interaction. In the first phase, Phase 1, the primary user is the telephone operating company (TOC) administrator. In the second phase, Phase 2, the primary user is the subscriber, and in the third phase, Phase 3, the primary user is a telephone switching system.

In the first phase, Phase 1, the TOC administrator assigns telephone call features to a subscriber's line at the request of a subscriber. In this situation, the TOC administrator first interrogates the FIA, which is located in a personal computer or workstation, to determine whether the feature requested by the subscriber can co-exist with features that are already assigned to the subscriber. In response, the FIA performs a two-fold analysis. First, it is determined whether the requested feature is available to the subscriber, that is, does the subscriber's line support the requested feature. Second, if the feature is available, it is determined whether the feature is compatible with the features already assigned to the subscriber's line. The latter analysis may be indeterminative during the Phase 1 operation because, for example, the conflicting interaction of two features may only occur if the two features are activated concurrently. In other words, the analysis may determine that a potential conflicting interaction could result, in which case, the FIA will permit the assignment of the requested feature and rely on the Phase 2 and/or Phase 3 operation to prohibit any interaction.

The second phase, Phase 2, relates to a subscriber activating one of the features previously assigned to the subscriber's line (during the Phase 1 operation) by special dialing an access code such as "#71." In this situation, the FIA is interrogated to determine first whether the user profile (i.e., a database storing features assigned during Phase 1 to the subscriber) of the subscriber includes the feature sought to be activated by the subscriber, and second to determine which features are currently active. If at least one feature is active, the FIA, which is embedded in the telephone switching system, continues to determine whether the feature sought to be activated and the features already active can co-exist. If more than one feature is active, the process accesses the FIA an appropriate number of times to resolve each potential interaction. Under these circumstances, the FIA provides feedback (e.g., an audible tone) to the subscriber which indicates whether the feature was successfully activated. A feature the subscriber desires to activate may not be activated because, for example, the feature may not be supported by the subscriber's line, or the feature may be incompatible with features already activated and assigned. As in Phase operations, potential interactions of two features may be identified but it may not be immediately apparent whether these two features can co-exist. Therefore, reliance is made on the Phase 3 operation to prohibit any interaction.

Finally, the third phase, Phase 3, identifies and resolves feature interactions that occur during the run-time operation, beginning with an origination of a call by a subscriber or an incoming call to a subscriber. In this situation, the FIA is first interrogated to check the current call state of the subscriber by examining the active memory associated with the subscriber to determine whether any feature can be invoked and/or whether any feature has already been invoked. Second, the FIA checks the user profile to determine whether any features are available for the subscriber at that point of time. For each pair of features to be arbitrated, the FIA is interrogated to reach a final conclusion, that is, whether the feature sought to be activated can co-exist with already existing and activated features.

Figure 2:
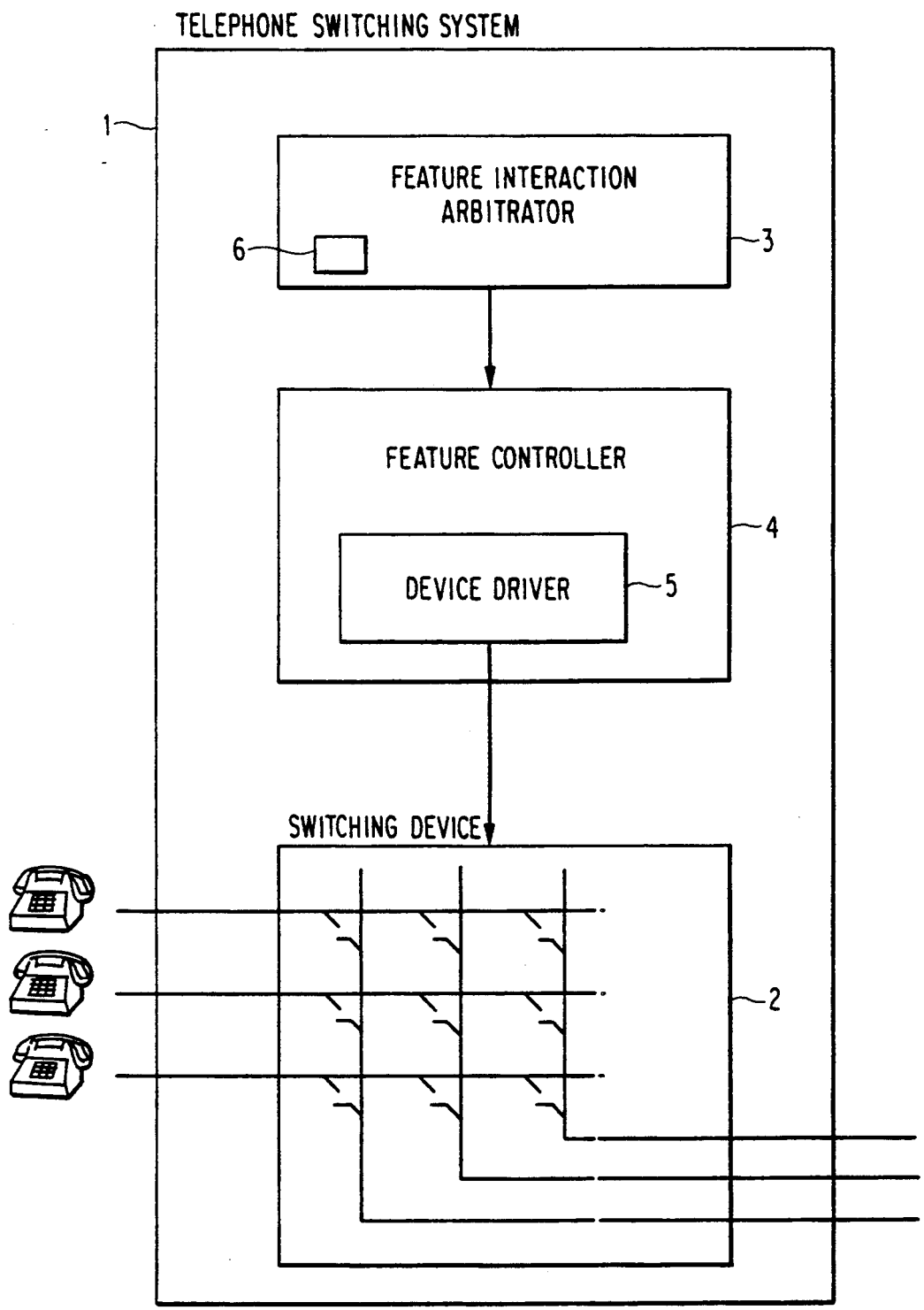
FIG. 2 shows a block diagram of the FIA in accordance with the present invention, and its interaction with switching device for post-arbritration action.

FIG. 2 illustrates a telephone switching system 1, which includes telephone switching equipment 2, the type of which is well known in the art, a FIA 3 including a feature database storage 6, and a feature controller 4, including a device driver 5 for controlling the switching elements of the telephone switching equipment.

The feature database storage 6 is composed of a pre-defined data structure for defining uniquely the properties and characteristics of each feature such that both static and dynamic feature interactions can be predicted and resolved. Each feature is defined by a set of feature elements, which are in turn grouped into classes. The pre-defined data structure includes a set of numerical values which is respectively assigned to each of the features such that a numerical value is assigned to each feature element.

More specifically, there are five classes, namely, LINE TYPE, CATEGORY 1, CATEGORY 2, BEHAVIOR, and PRIORITY, whose "feature elements" are respectively shown in Tables 1 to 5. Each class and their "feature elements" are described in more detail below in conjunction with the operation of the FIA.

The FIA applies the same decision logic and/or rules to the numerical values assigned to the feature elements for identifying and resolving feature interactions. Each feature element is assigned a numerical value depending on the feature's type, category, behavior, and/or priority. In addition, according to the class of the feature elements, there is a corresponding logical or arithmetic operation used to compare the numerical values of the feature elements. As will be further described, once the feature interaction has been identified and resolved, the feature controller 4, via the device driver 5, controls the telephone switching device 2 so that any conflicting features are not implemented.

Figure 3:
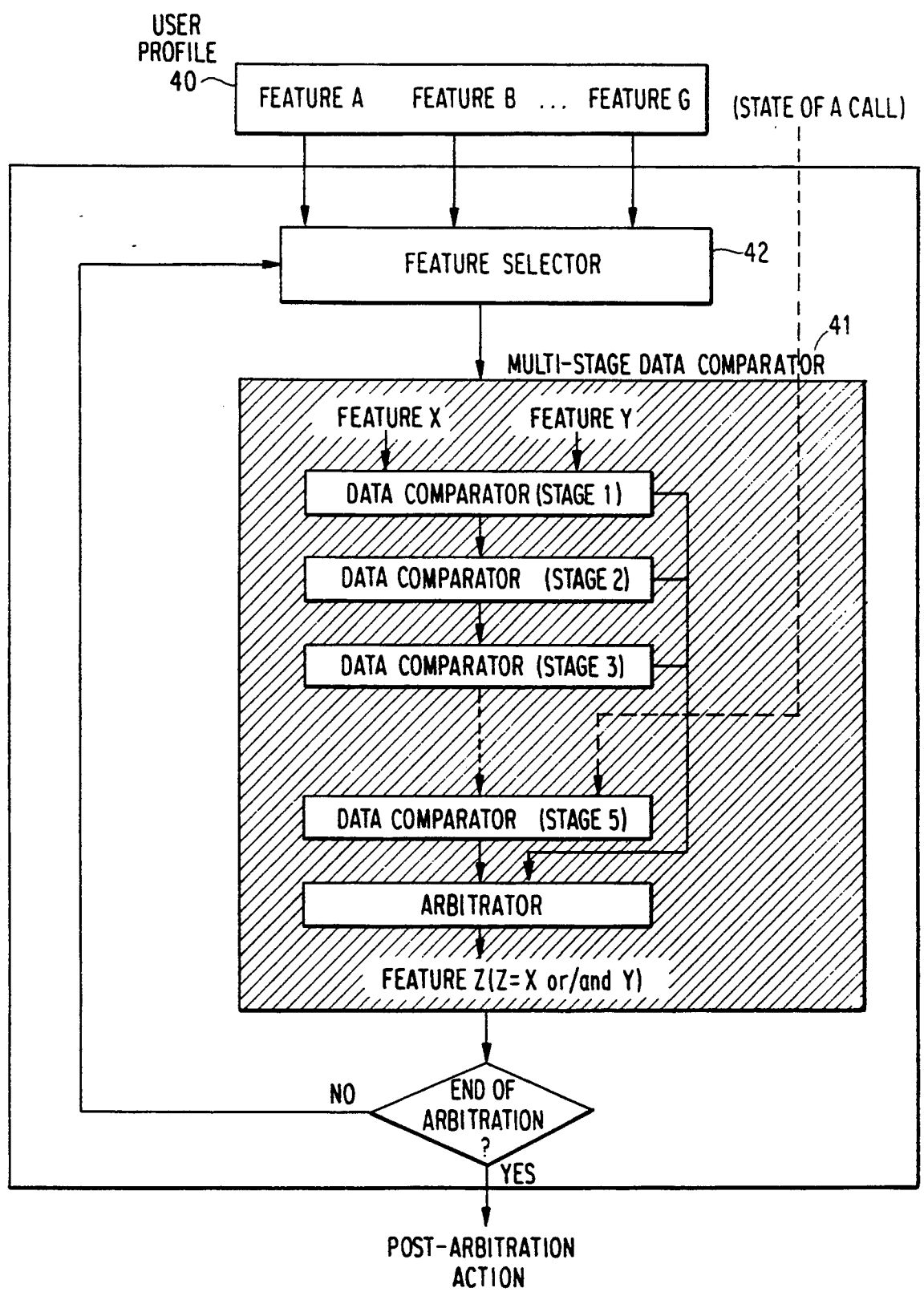
FIG. 3 shows a more detailed block diagram of the FIA of FIG. 2.

Referring now to FIG. 3, there is shown a preferred embodiment of the FIA including a multi-stage data comparator 41 and a feature selector 42 coupled to a user profile 40. The user profile 40 stores, inter alia, a list of the features Fa, Fb, Fc, . . . Fg, in which the subscriber has already been assigned. For instance, with respect to the feature call waiting, the subscriber will not be interrupted to indicate that a second call is pending unless the user profile indicates that call waiting is a feature assigned to the subscriber.

The feature selector 42, at the beginning of an arbitration, selects one feature at a time from the user profile 40, beginning with, for example, feature Fa. The primary user provides the feature in question, which will be identified herein as feature Fx, to the FIA. Therefore, feature Fx and feature Fy (Fy being equal to one of the features Fa, Fb, Fc, . . . in the user profile) are presented to the FIA for arbitration. As will become further apparent below, if feature Fx can co-exist with feature Fa, the feature selector will select the next feature Fb from the user profile 40. Accordingly, feature Fx and feature Fb will be presented to the FIA for arbitration. This process proceeds until a final conclusion is reached, namely, whether feature Fx can co-exist with all of the other features in the user profile. In other words, feature Fx and one feature from the user profile 40 are presented to the FIA until it is determined that feature Fx can co-exist with all of the features in the user profile 40, or feature Fx cannot co-exist with one of the features in the user profile 40.

The multi-stage data comparator 41 is defined in terms of stages, which may vary depending on the targeted environment, such as the United States, Europe, Japan, etc. For the description herein, the targeted environment is the United States and therefore the following six stages are required. The first stage identifies the system restrictions between a line type and a feature. The second and third stages classify features into categories. The fourth stage defines the nature of a feature as it pertains to feature interactions by comparing the behavior of two features. The fifth stage assesses the priority of two features. The sixth stage, using a normalized arbitration table, resolves the interaction between two features based upon the above analysis in the first through fifth stages.

Even more specifically, stages one through five respectively correspond to the classes LINE TYPE, CATEGORY 1, CATEGORY 2, BEHAVIOR, and PRIORITY. Each stage and their corresponding class including the feature elements will now be described in detail.

STAGE I

The first stage, which corresponds to the class LINE TYPE (TABLE 1), identifies system restrictions between the subscriber's line and features by determining whether a feature is compatible or supported by a subscriber's line. For example, there are two checking functions in Stage I. The first function is to check whether a desired feature can be applied to the specific line or not. If not, the feature can not be assigned to the subscriber's line (Not Allowed). This check can be accomplished by comparing with the line-type feature which represents the characteristics of the line. For example, the call waiting feature is not applicable to the COIN line, so that the call waiting feature should not (and cannot) be assigned to the COIN line. The second function is to check whether two features compared can be applied to the same line-type or not. If not, the two features cannot co-exist on the same subscriber's line (Not Allowed).

The class LINE TYPE includes the following line elements: INDIVIDUAL, TWO PARTY, FOUR PARTY, PBX, COIN, VIRTUAL, and IC/INC, as shown in TABLE 1, to define the "LINE" properties of each feature. For each feature element in the class LINE TYPE, there is assigned a numerical value of zero or one. The value of zero represents that a feature does not apply to that feature element, and a value of one represents that a feature does apply to that feature element. For example, referring to TABLE 2, feature Fy is respectively assigned the numerical values of zero, one, one, zero, zero, zero, and zero for the elements INDIVIDUAL, TWO PARTY, FOUR PARTY, PBX, COIN, VIRTUAL, and IC/INC. Therefore, in the above example, feature Fa is both a TWO PARTY and FOUR PARTY line. On the other hand, feature Fb, as defined in TABLE 1, is both an INDIVIDUAL and TWO PARTY line.

Figure 4A:
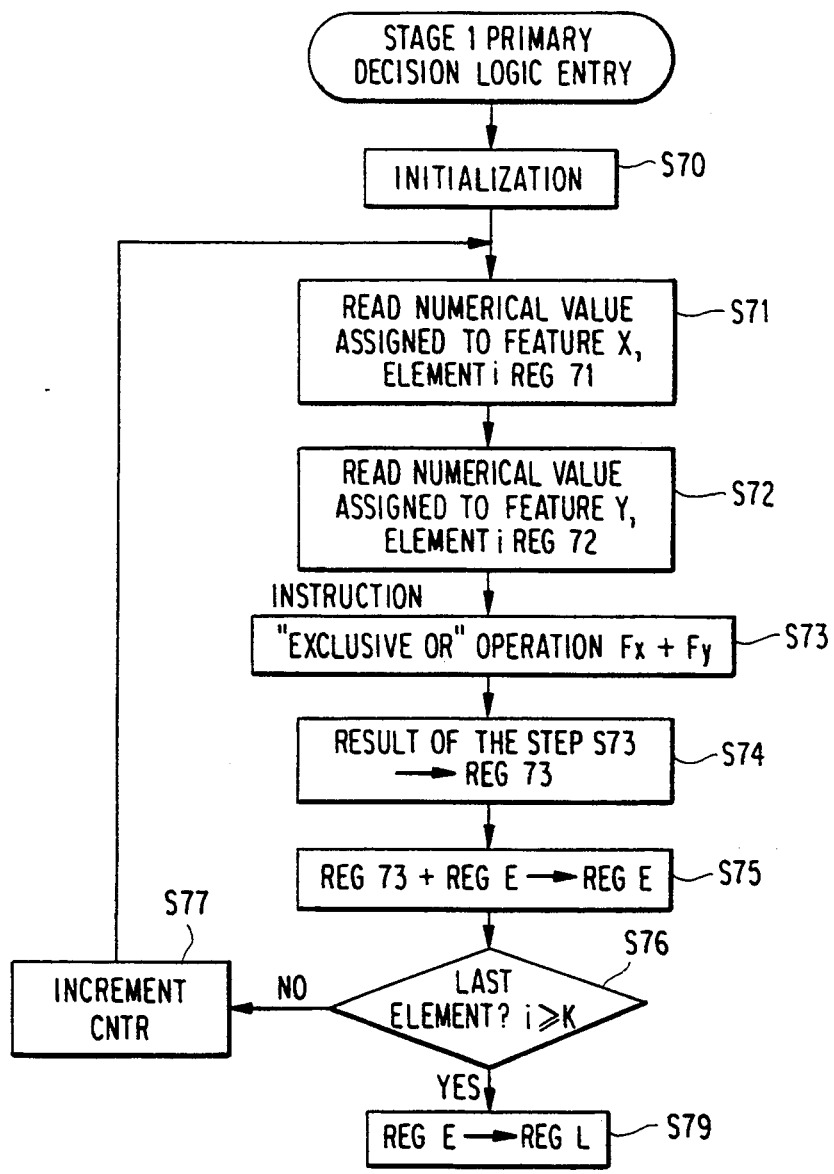
FIGS. 4A and 4B show a logical flowchart illustrating the operation of a first stage of the FIA of FIG. 2.

The first stage STAGE 1 analysis, shown in FIG. 4A, begins with an initialization step S70 to initialize a general purpose register REG E to zero and a counter CNTR to one. In step S71, the numerical value for feature Fx, element i (i being equal to the output of the counter CNTR, which is equal to one for the first iteration) is read and placed into a general purpose register REG 71. Similarly, in step S72, the numerical value for feature Fy, element i (i is still equal to one) is read and placed into a second general purpose register REG 72. In an operational step S73, the numerical values stored in registers REG 71 and REG 72 are exclusive-OR'd and the result is stored in a temporary general purpose register REG 73 in step S74. Next, in step S75, the result, which is currently stored in register REG 73, is added to the current value stored in the register REG E, which for at least the first iteration is zero. Next, in step S76, it is determined if each of the elements for the class LINE TYPE respectively corresponding to features Fx and Fy have been processed by comparing the element number i to the maximum number K of elements for the class LINE TYPE. If so, the first stage STAGE 1 analysis is completed. If not, then the process continues back to step S71 after first incrementing the counter CNTR by one in step S77.

During a second iteration through the first stage STAGE 1 analysis, in steps S71 and S72, the numerical values for the second elements (i.e., i now equals two) for the class LINE TYPE with respect to features Fx and Fy are respectively read and stored into registers REG 71 and REG 72. These values are exclusive-OR'd in step S73, and the result is placed in the temporary register REG 73 in step S74. The result, which is currently stored in the register REG 73, is now added to the contents of the register REG E, which contains the summation of the previous results. After each of the feature elements for the class LINE TYPE of features Fx and Fy have been analyzed, the result stored in the register REG E is moved to a register REG L, in step S78. Thus, the register L contains the summation of all of the results of the operational step S73, which can be expressed in general terms as:

$$L = \Sigma E(i) \text{ for } i = 1 \text{ to } K,$$

where K equals the number of feature elements in the class LINE TYPE.

Figure 4B:
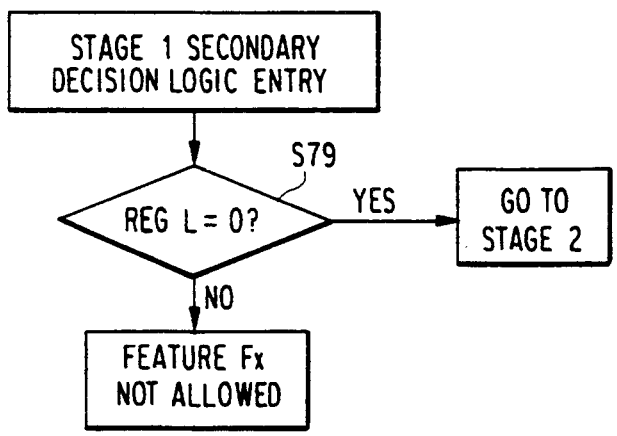

During a secondary decision logic process shown in FIG. 4B, the final result stored in the register REG L is compared with zero in step S79. If the final result is greater than zero then the feature Fx is "NOT ALLOWED." (The term "NOT ALLOWED" as used herein means that one feature can not be allowed to be assigned to a specific line-type (see TABLE 1) or the feature cannot co-exist with another feature assigned to the same line-type.) On the other hand, if the final result is equal to zero then the process advances to the second stage STAGE 2.

TABLE 1

| ELEMENT | DEFINITION |
| --- | --- |
| INDIVIDUAL LINE | Is the feature applicable to Individual Line |
| TWO PARTY LINE | Is the feature applicable to Two-party line |
| FOUR PARTY LINE | Is the feature applicable to Four-party line |
| PBX LINE | Is the feature applicable to PBX line |
| COIN LINE | Is the feature applicable to Coin Line that usually is a public line |
| VIRTUAL LINE | Is the feature applicable to Virtual Line, that is not associated with a line circuit (does not have a physical telephone), that is, the line can only be a terminating not an orginating (e.g., RCF) |
| IC/INC LINE | Is the feature applicable to InterLATA Carriers and International Carriers |

TABLE 2

| Feature Elements | Feature A Numerical Value | Feature B Numerical Value |
| --- | --- | --- |
| 1. Individual | 0 | 1 |
| 2. Two Pary | 1 | 1 |
| 3. Four Party | 1 | 0 |
| 4. PBX | 0 | 0 |
| 5. Coin | 0 | 0 |
| 6. Virtual | 0 | 0 |
| 7. IC/FNC | 0 | 0 |

STAGE II

The second stage corresponds to the class CATEGORY 2 and categorizes the feature at a fairly high level as shown in TABLE 3. The class CATEGORY 1 includes the two feature elements, namely, ORIGINATING/REDIRECTING and TERMINATING, and classifies features depending upon whether they are applicable to the origination/redirection or termination of a telephone call. That is, regardless of whether a call is originating or being redirected, it is classified in the same group. A numerical value of one is assigned to the first element if the feature applies to the origination or redirection of a telephone call, otherwise a value of zero is assigned thereto. Likewise, a value of one is assigned to the second feature element TERMINATION if the feature is applicable to the termination of a telephone call, otherwise a value of zero is assigned.

Figure 5A:
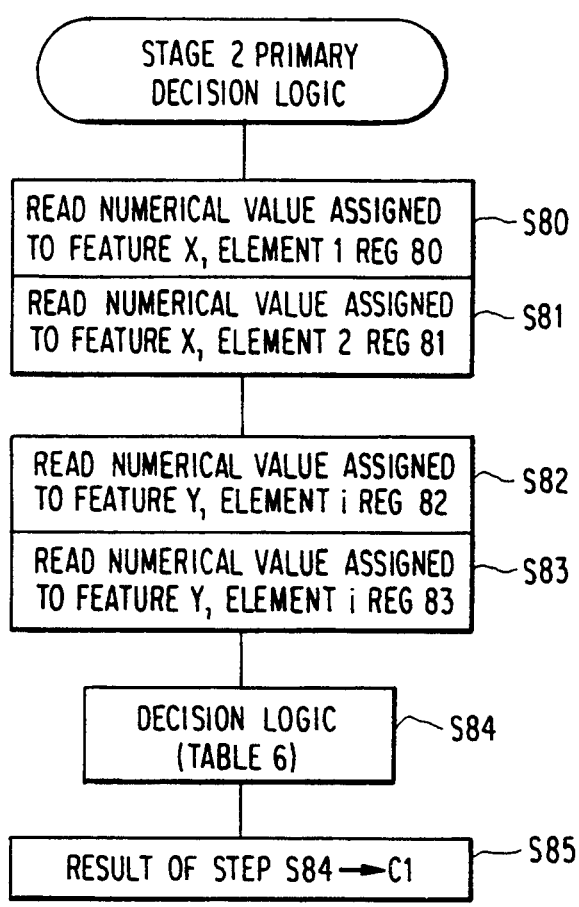
FIGS. 5A and 5B show a logical flowchart illustrating the operation of a second stage of the FIA of FIG. 2.

FIG. 5A shows a flowchart illustrating the second stage STAGE 2 analysis. In steps S80 and S81, the numerical values assigned to the feature Fx, elements 1 and 2 are respectively read into and stored into two registers REG 81A and REG 81B. Likewise, in steps S82 and S83, the numerical values assigned to the feature Fy, elements 1 and 2 are respectively read into and stored into two registers REG 82A and REG 82B. In step S84, the numerical values in the registers REG 81A, REG 81B, REG 82A, and REG 82B are compared to predetermined values stored in a look-up table an example of which is shown in TABLE 4. The result of the comparison, which determines whether the features Fy and Fx are in the same category, is stored into register REG C1 in step S85.

More specifically, if the numerical values stored in registers REG 81A and REG 81B respectively equal zero and one, and the numerical values stored in registers REG 82A and REG 82B respectively equal one and zero, then the features Fx and Fy are classified as being in different categories and a value of zero is stored in REG C1. Otherwise, the features Fx and Fy are considered to be in the same category CATEGORY I and a value of one is stored in REG C1.

Figure 5B:
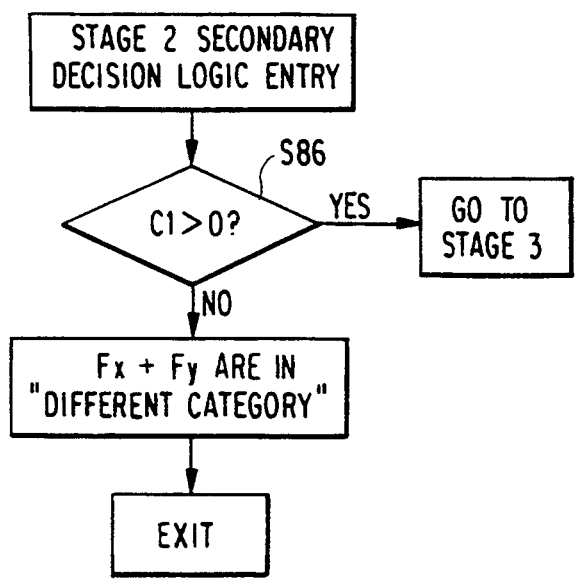

The second stage STAGE 2 secondary decision logic, as shown in FIG. 5B, compares the result stored in register REG C1 to zero in step S86. If the result is greater than zero, then the features Fx and Fy are in the same category and the analysis continues onto the next stage STAGE 3. Otherwise, if the result stored in register REG C1 is zero, then the features Fx and Fy are of different category and therefore no interaction will occur (at least between the features Fx and Fy) and the process exits the FIA. That is, the features Fx and Fy can co-exist.

TABLE 3

| ELEMENT | DEFINITION |
| --- | --- |
| ORIGINATING | Does the feature involve an originating call |
| TERMINATING | Does the feature involve a terminating call |
| REDIRECTING | Does the feature involve redirecting a call |

TABLE 4

| FEATURE X e1.e2 | FEATURE A e1.e2 | ELEMENTARY RESULT OF THE ELEMENT ½ (E12) |
| --- | --- | --- |
| 0.0 | 0.0 | 1 |
| 0.0 | 0.1 | 1 |
| 0.0 | 1.0 | 1 |
| 0.0 | 1.1 | 1 |
| 0.1 | 0.0 | 1 |
| 0.1 | 0.1 | 1 |
| 0.1 | 1.0 | 0 (Different Category) |
| 0.1 | 1.1 | 1 |
| 1.0 | 0.0 | 1 |
| 1.0 | 0.1 | 0 (Different Category) |
| 1.0 | 1.0 | 1 |
| 1.0 | 1.1 | 1 |
| 1.1 | 0.0 | 1 |
| 1.1 | 0.1 | 1 |
| 1.1 | 1.0 | 1 |
| 1.1 | 1.1 | 1 |

STAGE III

The third stage corresponds to the second category class CATEGORY II, and categorizes each feature according to the resources they use. The feature elements (shown in TABLE 5) for the class CATEGORY II include, for example: ADDITIONAL CALL LEG, ACCESS CODE, ACTIVATION SEQUENCE, LINE TYPE CONFLICT, INTEROFFICE SIGNALING, and CPE INTERFACE. As in the first two stages, a numerical value of zero or one is assigned to the feature element for each feature. A numerical value of one is assigned to the feature element if the feature belongs to that category, otherwise, a value of zero is assigned to that feature element. A feature may belong to more than one category (i.e., be applicable to more than one feature element).

Figure 6A:
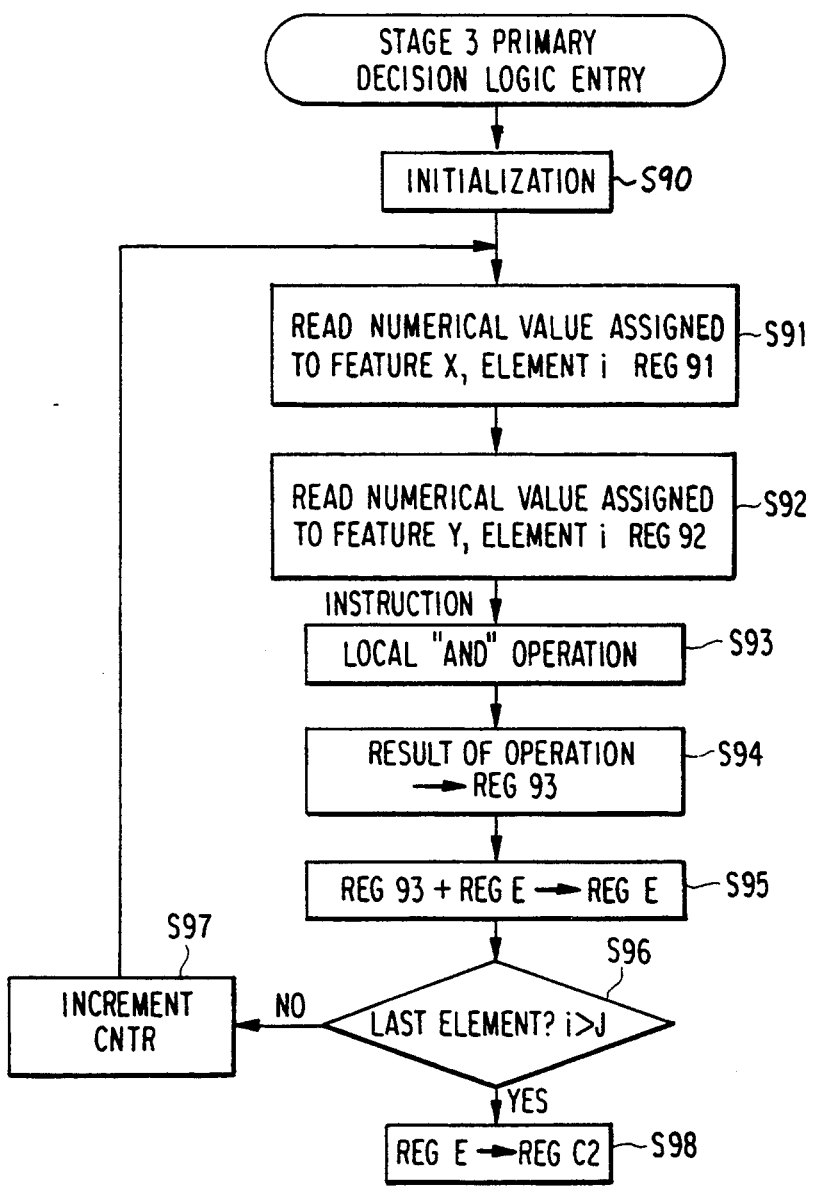
FIGS. 6A and 6B show a logical flowchart illustrating the operation of a third stage of the FIA of FIG. 2.

The analysis for the third stage STAGE 3 which classifies the features into the second category CATEGORY II is shown in FIG. 6A. The analysis is similar to the first stage STAGE 1 analysis, except for the operational step (step S93). Beginning with step S90, the register REG E and counter CNTR are respectively initialized to zero and one. In step S91, the numerical value assigned to element i of the feature Fx is read and stored in the register REG 91. In step S92, the numerical value assigned to the feature Fy, element i is read and stored in the register REG 92. In step S93, the two numerical values stored in the two registers REG 91 and REG 92 are logically AND'd to provide a result which is temporarily stored in register REG 93. In step S95, the result temporarily stored in register REG 93 is then added to the contents of the register REG E and then stored in the register REG E. In step S96, the element number i is compared with a predetermined value J, where J represents the total number of elements for the class CATEGORY II. If the element number i is greater than the predetermined value J, the current value stored in register REG E is moved to a register REG C2. If the element number i is not greater than the predetermined value J then the process is repeated, after the counter CNTR is incremented in step S97.

Figure 6B:
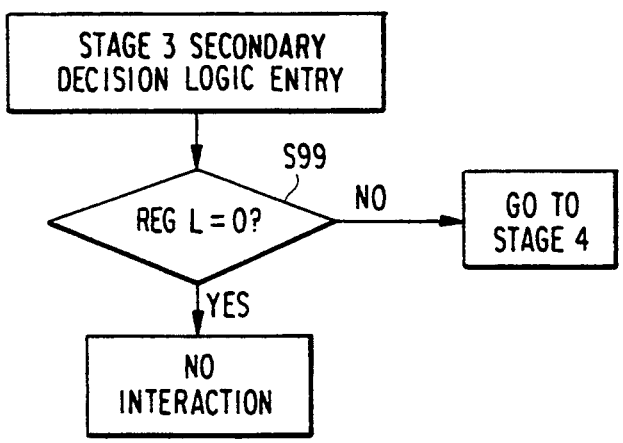

Referring to FIG. 6B, secondary decision logic for the third stage STAGE 3 compares, in step S99, the result stored in the register REG C2 to zero. If the result in the register REG C2 is greater than zero, then the arbitration continues onto the next stage STAGE 4 of analysis. Otherwise, if the result stored in register REG C2 equals zero, then the features Fx and Fy are considered "DIFFERENT" and thus, no interaction will occur between them. Accordingly, the FIA with respect to features Fy and Fx is then terminated.

TABLE 5

| ELEMENT | DEFINITION |
| --- | --- |
| ADDITIONAL CALL LEG | Does the feature use an additional call leg to involve a third party |
| ACCESS CODE | Does the feature need to be activated by using an Access Code |
| ACTIVATION SEQUENCE | Does the feature need more activation steps beside using the Access Code |
| LINE TYPE CONFLICT | Does the feature have some conflicts with other features due to the line type |
| INTEROFFICE SIGNALING | Does the feature provide, or require interoffice signaling capability. The interoffice signaling includes signaling associated with tandem calls and operator services |
| CPE INTERFACE (BILLING) | Does the feature need a Customer Premises Equipment interface for Message register |
| CPE INTERFACE | Does the feature need a CPE |

TABLE 5-continued

| ELEMENT | DEFINITION |
| --- | --- |
| (SIGNALING) | interface for signaling | them. Accordingly, the FIA with respect to features Fy

STAGE IV

The fourth stage STAGE 4, which corresponds to the class BEHAVIOR, defines the nature of a feature as it pertains to the feature interactions with respect to the feature elements shown in TABLE 4. Each element listed in TABLE 6 presents a question, the answer of which will determine the numerical value assigned to that feature element. For this class BEHAVIOR, the feature elements are assigned a numerical value of minus one, zero, or one. If the answer to the question is positive or is the first choice, a value of one is assigned to the feature element. If the answer is negative or is the second choice, a value of minus one is assigned to the feature element. Otherwise, if neither a value of one nor minus one is appropriate, a value of zero is assigned to the feature element.

For example, regarding the feature element TERMINATING CALL DIRECTION, the question presented is as follows, "Does the feature attempt to terminate or transfer a terminating call?" In the case of the call waiting feature, a numerical value of one is applied to this feature element because it attempts to terminate a terminating call. For the feature call forwarding when busy, because it attempts to transfer a terminating call, a numerical value of minus one is assigned to the feature element TERMINATING CALL DIRECTION. For the feature speed dialing a numerical value of zero is assigned to the TERMINATING CALL DIRECTION feature element because neither minus one or one apply.

Figure 7A:
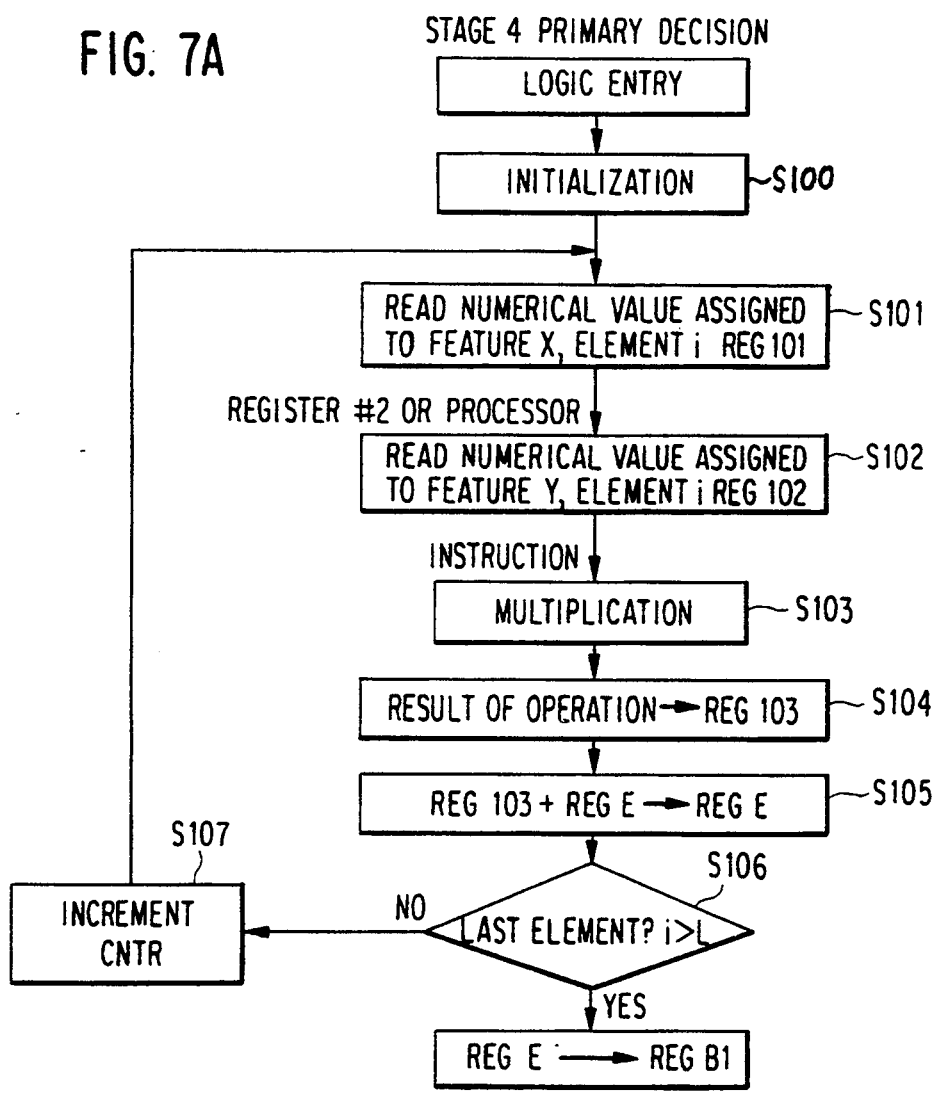
FIGS. 7A and 7B show a logical flowchart illustrating the operation of a fourth stage of the FIA of FIG. 2.

The fourth stage STAGE 4 analysis is shown in FIG. 7A. In step S100, the register REG E and counter CNTR are respectively initialized to zero and one. In steps S101 and S102, the numerical values assigned to feature Fx, element i and the feature Fy, element i are respectively read and stored into registers REG 101 and REG 102. In step S103, the numerical values stored in registers REG 101 and REG 102 are multiplied yielding a result, which is temporarily stored in register REG 103. The result stored in the register REG 103 is then added in step S105 to the current value stored in register REG E. In step S106, it is judged whether all of the elements have been processed by comparing the feature element number i to L (L being the maximum number of feature elements for the class BEHAVIOR). If no, the counter CNTR is incremented in step S107 and then the process repeats beginning with step S101. If yes, the result stored in the register REG E is transferred to register REG B1.

Figure 7B:
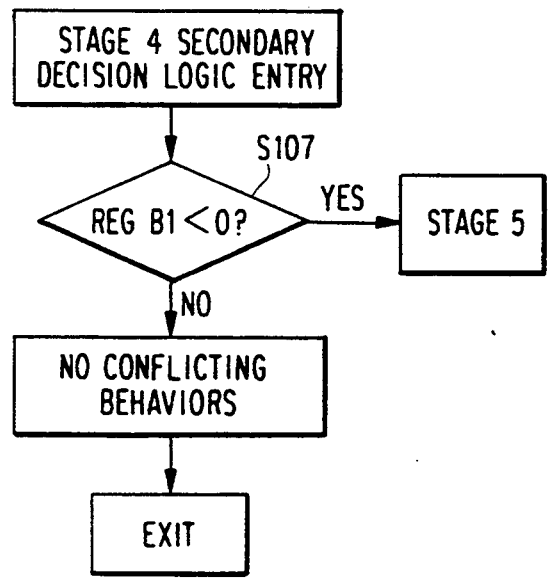

The secondary decision logic, shown in FIG. 7B, compares the value stored in register REG B1 with zero in step S107. If the result stored in register B1 is less than zero, then the behaviors of the two features are considered to be conflicting and, thus, the process moves onto the next stage STAGE 5 to determine which feature is of higher priority. If the result stored in register B1 is greater than or equal to zero then there is no conflicting behavior and the feature Fx is accepted.

TABLE 6

| ELEMENT | DEFINITION |
| --- | --- |
| PRECEDENCE | Does the feature execution need to compare |

TABLE 6-continued

| ELEMENT | DEFINITION |
| --- | --- |
| | priorities with the existing feature. |
| MULTI-LINE | Does the feature consider each line if a multi-line feature is involved. |
| ORIGINATING CALL DIRECTION | Does the feature attempt to terminate or transfer an original call. |
| TERMINATING CALL DIRECTION | Does the feature attempt to terminate or transfer a terminating call. |
| ORIGINATING EXECUTION | Does the feature have to or conditionally execute at the originating end. |
| TERMINATING EXECUITON | Does the feature have to or conditionally execute at the terminating end. |
| BILLING MEASURABLE | Does the feature require or cannot measure billing of a call origination. |
| TRANSFER AVOIDANCE | Does the feature inhabit or have to transfer an originating call due to another feature (e.g., CF, SC) (RHMC) |
| ADDITIONAL LEG | Does the feature require or disallow to create an additional call 1 e.g., (CFV, RCF) |
| SCREENING | Does the feature require or disallow to apply screening treatment. |
| Op SERVICES CONNECTION | Does the feature require to connect to an Operator Service |
| Op SERVICES ROUTING | Does the feature require to be routed to an Operator Service |
| HOOK FLASH | Does the feature require or disallow a hook flash during its execution |
| SIGNAL REGENERATION | Does the feature have signals that should be regenerated due to an intervening CPE existing between called and network (e.g., TWC, USTWC) or the feature is an intervening CPE (e.g., PBX). |
| SIGNAL MODIFICATION | Does the feature require or utilize changing the standard outpulsed information on interoffice signaling (e.g., IC/INC, CL) |
| SERIES HUNTING | Does the feature need to involve every line in a series group. |
| MULTI-PARTY LINE | Does the feature need to involve every line of a multi-party or have multi-party line. |
| LOCAL OPERATOR | Does the feature must or conditionally connect to the local operator |
| CODE COMBINATION | Does the feature need to care code sequence, combination, and restriction. |
| ORIGINATION TREATMENT | Does the feature attempt to initiate or deny a call origination. |
| TERMINATION TREATMENT | Does the feature attempt to accept or reject a call termination. |
| MULTI-LINE HUNTING | Does the feature need to consider each individual line or have mult-line. |
| SKIP OPERATOR | Does the feature need or cannot skip the local operator. |
| OPERATOR TERMINATION | Does the feature can or cannot terminate a call at the operator end. |
| SINGLE-MULTI EXTENSION | Does the feature only serve single line or multi-line. |
| NUMBER RESTRICTION | Does the feature have to consider number restrictuion or have code restriction. CFV cannot use a restricted number as a forwarding destination and its value is 1; while CDRD does restrict numbers and its value is −1. |
| PRECEDENCE | Does the feature need to compare its priority with another. This element has to be evaluated with the next one. The effectiveness of the feature's relative priority to another relies on their values of the next element. |
| HIGHEST-LOWEST | Does the feature have the highest or the lowest priority in its scope. This element has to be evaluated with the previous one. |

STAGE V

The fifth stage STAGE 5 corresponds to the class PRIORITY and accordingly prioritizes the features. The feature elements, which are shown in TABLE 7, are listed in a descending order of precedence, with the feature element FEATURE TYPE having the highest priority, the next feature element CONTROL TYPE having the next highest priority, and the feature element TUNE LEVEL is of the lowest priority. Each feature element is further divided into at least two and at most four sub-elements, which are also ordered in terms of priority. For example, the feature element FEATURE TYPE is divided into four sub-elements, which are in the order of highest precedence to lowest precedence: FAULT RECOVER, CALL-FEATURE CONTROL, MAINTENANCE, and ELSE (i.e., none of the others apply). On the other hand, the feature element ACTION TYPE is divided into two sub-elements, namely, ACTION WITHOUT DELAY and ACTION WITH DELAY.

The numerical assignment for the class PRIORITY has two levels. First, each feature element is weighted by a power of ten according to its level of precedence. That is, the feature element FEATURE TYPE is weighted by $10^{N-1}$, wherein N equals the number of feature elements for the class PRIORITY. For the specific example described herein and shown in TABLE 5, N equals nine. Thus, the feature element FEATURE TYPE is weighted by $10^8$, CONTROL TYPE is weighted $10^7$, and the lowest priority feature element TUNE LEVEL is weighted $10^0$.

The second level of numerical assignment involves assigning the feature elements a numerical value in the range of zero to three, according to the sub-element which is applicable. For instance, for the feature element FEATURE TYPE, a numerical value of three represents that the sub-element FAULT RECOVER applies, that is, the feature is a fault recovery type. The assignment of a value of two represents that sub-element CALL-FEATURE CONTROL applies, a value of one represents that the sub-element MAINTENANCE applies, otherwise a value of zero (meaning neither sub-elements FAULT RECOVER, CALL-FEATURE CONTROL, nor MAINTENANCE applies) is assigned to the element FEATURE TYPE for the feature.

The fifth stage STAGE 5 begins with steps S110 and S111 wherein the numerical values for the feature elements of the feature Fx are read, expanded, and then stored in a first register REG 111. The expansion of the priority value P(Fx) for the feature Fx is defined by the following relationship:

$$P(Fx) = [E(1)] \times 10^{N-1} + [E(2)] \times 10^{N-2} + \ldots + [E(N)] \times 10^0$$

wherein:

E(1) equals the numerical value for the first feature element of the class PRIORITY;

E(2) equals the numerical value for the second feature element of the class PRIORITY;

E(N) equals the numerical value for the Nth feature element of the class priority; and N equals the number of feature elements for the class PRIORITY.

Next, in step S112, the numerical values for the feature elements of the feature Fy is read, expanded, and then stored in the second register REG 112. The priority value P(Fy) for the feature Fy is similarly expanded according to the equation:

$$P(Fy) = [E(1)] \times 10^{N-1} + [E(2)] \times 10^{N-1} + \ldots + [E(N)] \times 10^0$$

wherein:

E(1) equals the numerical value for the first feature element of the class PRIORITY;

E(2) equals the numerical value for the second feature element of the class PRIORITY;

E(N) equals the numerical value for the Nth feature element of the class PRIORITY; and N equals the number of feature elements for the class PRIORITY.

In step S113, the value stored in the second register REG 112 is subtracted from the value stored in the first register REG 111 and the result is stored in register REG P.

Figure 8A:
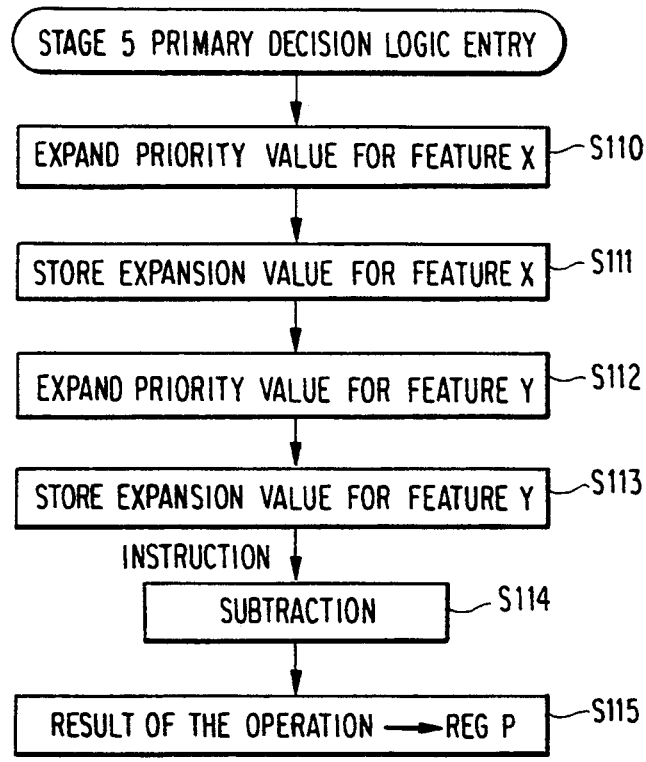
FIGS. 8A and 8B show a logical flowchart illustrating the operation of a fifth stage of the FIA of FIG. 2.
Figure 8B:
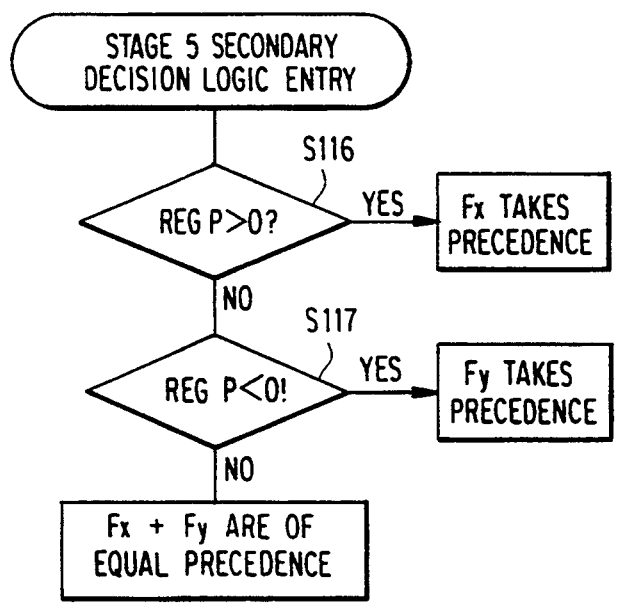

The secondary decision logic, shown in FIG. 8B, compares the result stored in the register REG P to zero in steps S116 and S117. If the result is greater than zero then the feature Fx has precedence over the feature Fy. If the result equals zero, then the features Fx and Fy are of equal priority. And, if the result is less than zero, then feature Fy takes precedence over feature Fx.

TABLE 7

| ELEMENT | 3 | 2 | 1 | 0 | WEIGHT |
|---|---|---|---|---|---|
| FEATURE TYPE | Fault Recover | Call-Feature Control | Maintenance | Else | $10^8$ |
| CONTROL TYPE | Emergency | Call-Feature | Call-state | Call | $10^7$ |
| ACTION TYPE | | | Act w/out delay | Act w/delay | $10^6$ |
| ORIG./TERM | Exception Handle | Originating | Terminating | Else | $10^5$ |
| PROCEED TYPE | | w/out Call Contn. | w/Call Cont | Else | $10^4$ |
| INTERRUPTION (O) | | Reject | Accept | Else | $10^3$ |
| INTERRUPTION (T) | | Accept | Reject | Else | $10^2$ |
| BUSINESS/ RESIDENCE | | Business | Residential | Else | $10^1$ |
| TUNE LEVEL | not used | | | | $10^0$ |

STAGE VI

Figure 9:
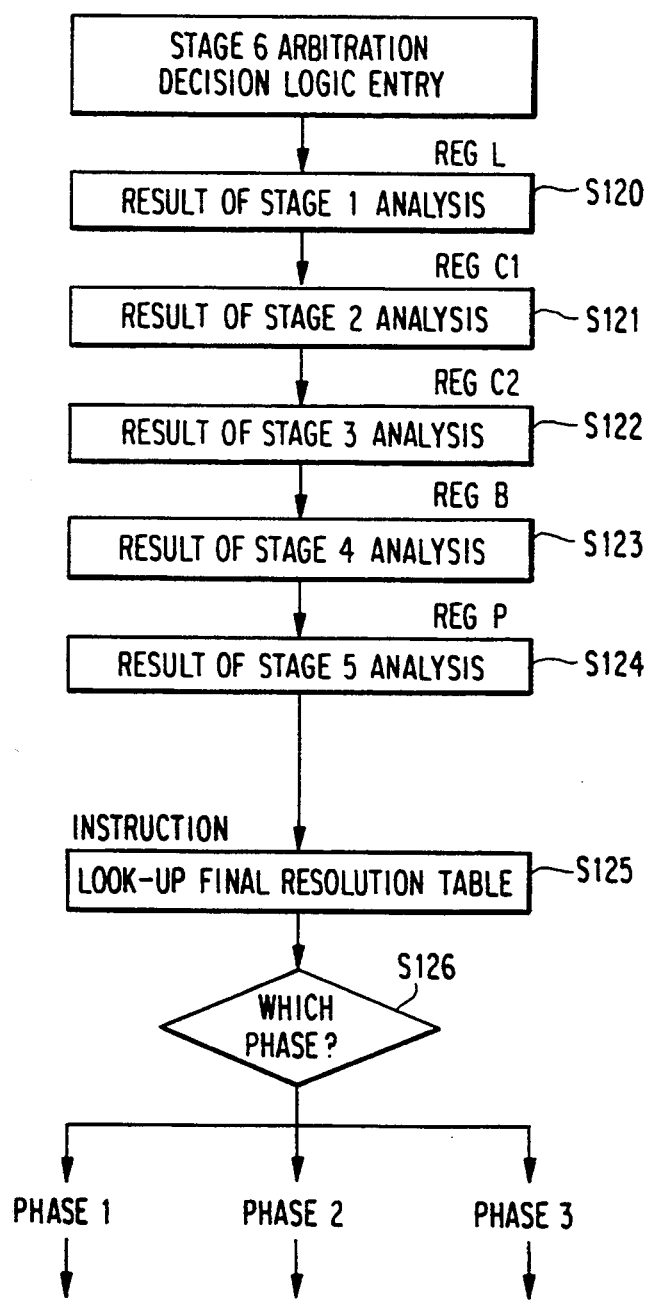
FIG. 9 shows a logical flowchart illustrating the operation of an arbitration step performed by the FIA of FIG. 2.

The final stage STAGE 6 arbitrates the results from the first through fifth stage STAGE 1 to 5. With reference to FIG. 9, the results from each stage, which are stored in the storage registers L, C1, C2, B, and P, are retrieved in steps S120–S124 and compared to data stored in a look-up table, in step S125. Depending on the results in the registers L, C1, C2, B, and P, and the phase of operation PHASE 1, 2, or 3, a resolution of any interaction is determined. TABLE 8 summarizes the possible actions that will take place. That is, either the feature will be NOT ALLOWED (N), ALLOWED (A), REJECTED (R), or INTERACT (I).

TABLE 8 represents six case situations A–F in which the FIA identifies and resolves feature interactions between a feature sought to be activated and features in the subscriber's user profile.

Case A represents a condition during Phase 1 operation wherein the feature Fx is requested by a subscriber but is NOT ALLOWED because it is either not supported by the subscriber's line or is not compatible with features already assigned to the subscriber (i.e., features in the user profile). Because it is determined in Phase 1 that the feature Fx is NOT ALLOWED, Phase 2 and Phase 3 operations are not necessary.

Case B represents the situation wherein the feature Fx is ALLOWED in all three phases because it is assigned to the subscriber (i.e., it passes Stage 1 scrutiny) and it is in a DIFFERENT category than the other features in the user profile.

Cases C-F represent situations wherein the feature Fx is ALLOWED by Stage 1, but is determined to be in the SAME category CATEGORY 1 as another feature in the user profile. Therefore, reliance on the further stages STAGE 3, 4, and 5 is made to identify further and resolve any potential interaction. Case C summarizes the situation where the feature Fx does not use the same resources as the other features in the user profile. Thus, a value of zero is stored in the register REG C2. Accordingly, the feature Fx is ALLOWED in all phases.

Cases D-F summarizes the situations where the feature Fx uses similar or the same resources as another feature in the user profile. Thus, a value of one is stored in the register REG C1. Accordingly, the arbitration process continues onto the next stage STAGE 4 to analyze the behavior of the feature Fx vis-a-vis the feature in which the feature Fx is classified into the same category CATEGORY II. Case D relates to when the feature Fx behaves in a non-conflicting manner with respect to the other feature(s) that are in the same categories CATEGORY I and II. Because the behaviors are non-conflicting, the feature Fx is ALLOWED in all three phases.

Cases E and F thus relate to where the feature Fx behaves in a conflicting manner with respect to the other features that are in the same categories CATEGORY I and II. Case E relates to where the next stage STAGE 5 determines that the priority of the feature Fx is higher than the other interacting feature. Thus, in Phase 3, the feature Fx is ALLOWED (Case E). On the other hand, the feature Fx is judged to be of lower priority and therefore it is REJECTED in Phase 3 (Case F). In PHASE I, the feature Fx is also ALLOWED, but as will be explained, the Phase 1 analysis is not capable of detecting behavior conflicts. As to Phase 2, the results are INTERACT because the Phase 2 analysis was able to detect that the feature Fx and a feature in the use profile were classified in the same categories CATEGORY I and II and behaved in conflicting manners.

Figure 10:
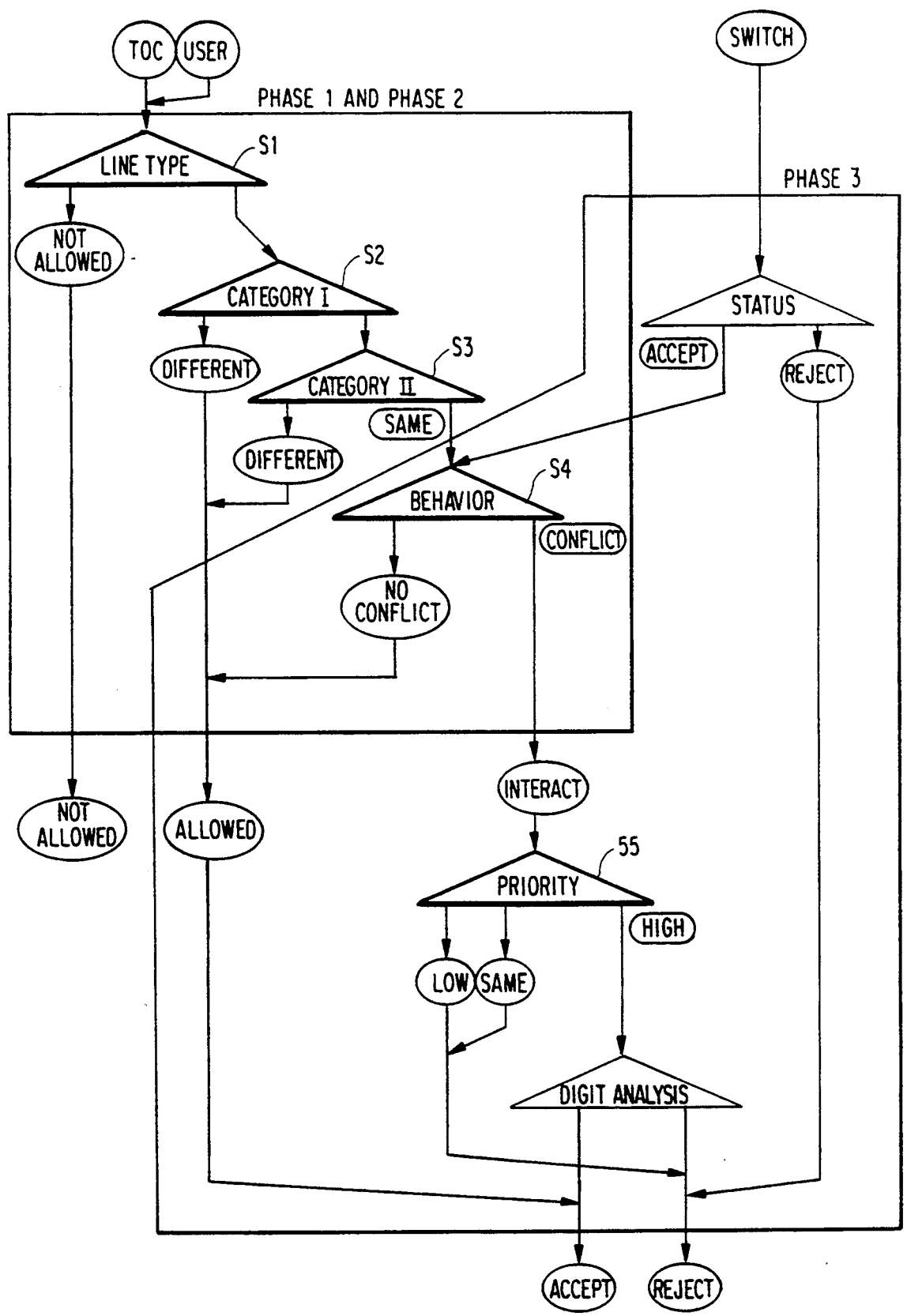
FIG. 10 shows a logical flowchart illustrating the operation of the FIA of FIG. 2.

Referring now to FIG. 10, a flowchart illustrates logically the steps of identifying and resolving the interactions of features. As a preliminary matter, it is noted that not all stages are performed in all phases. That is, during phases Phase 1 and Phase 2, the process proceeds from the first stage STAGE 1 of identifying the LINE TYPE to the fourth stage STAGE IV of identifying the BEHAVIOR of the feature.

Entry points are indicated by identifying the primary user, that is, the TOC (i.e., telephone operating company) administrator, subscriber, or switch.

In step S1, which corresponds to the first stage STAGE 1 analysis, two features are judged, such as the features Fx and Fy, as to whether each can be assigned to the end-user's line. If the feature Fx can be assigned, it is "ALLOWED" and the process continues onto step S2 or the second stage STAGE 2 analysis. On the other hand, if the feature Fx is not applicable to the subscriber's line then the feature Fx is "NOT ALLOWED." At step S2, it is determined whether two features are within the same category or class CATEGORY I as defined above and in TABLE 2. Accordingly, either the features are "DIFFERENT" in which case the feature Fx is allowed or the "SAME" in which case the process proceeds onto the third stage STAGE 3. At step S3, a second level of scrutiny of the features Fx and Fy, in accordance with TABLE 3, is performed. Similar to the second stage STAGE 2, if the features Fx and Fy are "DIFFERENT" then the feature is allowed, and if the features Fx and Fy are the "SA34E" then the process advances to step S4. At step S4 or the fourth stage STAGE 4 the behavior of the features Fx and Fy are judged. If there is a "CONFLICT" in their behavior, then the process moves onto step S5. On the other hand, if there is "NO CONFLICT" then the feature Fx is allowed. In step 5, run-time feature interaction is checked by comparing the priorities among the features Fx and Fy, for example. The higher priority feature will take precedence over the lower priority feature, and accordingly, the former will be accepted. Because features behave differently with respect to the states of a telephone call, such as IDLE, DIALING, RINGING, TALKING, RELEASING, a feature is not necessarily effective at all of the call states. If the feature is not effective at the current call state, it is simply rejected at that point of time. On the other hand, if the feature is effective during the current call state then the feature is accepted and passed to the FIA. Thus, during the actual run-time phase, Phase 3, the features are screened first.

After the stage STAGE 4 or step S4, a determination that there is a conflict between two features results in a feature interaction. In step S5, the priority of the features Fx and Fy will be determined. The higher priority feature will take precedence over the lower priority feature, and, accordingly, the former will be accepted.

Finally, after arbitration, the FIA controls, via the feature controller 4 and device driver 5 (FIG. 2), the telephone switching system accordingly. For instance, if feature Fx is "ALLOWED" the connection-sequence of the switch is activated so as to invoke or implement the feature Fx. On the other hand, if the feature Fx is "NOT ALLOWED" then the switch is controlled to invoke or implement the other features in the user profile accordingly, but not feature Fx.

There has thus been shown and described a Feature Interaction Arbitrator which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

TABLE 8

| Case | Stage 1<br>Line Type<br>L | Stage 2<br>Cat. I<br>C1 | Stage 3<br>Cat. II<br>C2 | Stage 4<br>Behavior<br>B | Stage 5<br>Priority<br>P | Phase 1 | Phase 2 | Phase 3 |
|---|---|---|---|---|---|---|---|---|
| A | >0(n) | | | | | | | N |

TABLE 8-continued

| Case | Stage 1 Line Type L | Stage 2 Cat. I C1 | Stage 3 Cat. II C2 | Stage 4 Behavior B | Stage 5 Priority P | Phase 1 | Phase 2 | Phase 3 |
|---|---|---|---|---|---|---|---|---|
| B | 0 | 0(D) | | | | A | A | A |
| C | 0 | 1 | 0(D) | | | A | A | A |
| D | 0 | 1 | 1(S) | $\geq 0$ | | A | A | A |
| E | 0 | 1 | 1(S) | <0(C) | >0(H) | A | I | A |
| F | 0 | 1 | 1(S) | <0(C) | <0(L) | A | I | R |

N: Not Allowed
A: Allowed
D: Different Category
S: Same Category
C: Conflict
H: Higher Priority
L: Lower Priority
I: Interact
R: Rejection

What is claimed is:

1. A method of managing feature interactions in a telephone switching system which is capable of implementing a plurality of features, said method comprising the steps of:
   a) an identifying step for identifying an interaction between at least two features of said plurality of features including a first feature and a second feature by performing operations on numerical values assigned to feature elements of said plurality of features and thereby obtaining an allowability result, said first feature being a feature sought to be activated by a primary user, and said second feature being a feature already assigned to a subscriber; and
   b) a controlling step for controlling said switching system in response to the identifying step by choosing one of the choices of implementing and avoiding said interaction, depending on said allowability result.

2. The method as recited in claim 1, further comprising the step of repeating said identifying step, said second feature successively representing a different one of said plurality of features that is already assigned to said subscriber with each repetition, until a determination is made of one of the following two conditions;
   1) each successive said second feature assigned to said subscriber is capable of co-existing with said first feature; and
   2) one of successive said second features cannot co-exist with aid first feature.

3. The method as recited in claim 1, wherein said identifying step comprises the step of identifying system restrictions between a line type and said first and second features; and determining whether each of said first and second features is allowed.

4. The method as recited in claim 3, wherein when each of said first and second features are allowed, said identifying step further comprises the steps of:
   a) grouping said first and second features according to their type of origination, redirection, and termination, and advancing to step b) if said first and second features are in the same group, and if said first and second features are in different groups then accepting said first feature and advancing to step d);
   b) grouping said first and second features according to the resources used by said first and second features, and advancing to step c) if said first and second features are in the same group, and if said first and second features are in different groups then accepting said first feature and advancing to said step d);
   c) determining whether the behavior of said first and second features are conflicting, and advancing to step d) if said first and second features have conflicting behaviors, and ifs aid first and second features have non-conflicting behaviors then accepting said second feature and advancing to said step d); and
   d) prioritizing said first and second features, accepting the one of said first and second features having higher priority than the other, rejecting the one of said first and second features having lower priority than the other, and rejecting both of said first and second features if said first and second features are of equal priority.

5. The method as recited in claim 1, wherein said controlling step comprises the step of controlling said switching system so as to implement said accepted feature.

6. The method as recited in claim 3, wherein said step of identifying system restrictions comprises the steps of:
   exclusive-OR'ing said numerical values assigned to a first class of feature elements of said second feature with said numerical values assigned to said first class of feature elements of said first feature;
   summing the results of said exclusive-or'ing step; and
   comparing said summed result to a predetermined value to determine whether to allow said first and second features.

7. The method as recited in claim 4, wherein said first step of grouping features comprises the steps of:
   for each of said first and second features, comparing said numerical values assigned to said feature elements of a second class to predetermined numerical values stored in a look-up table;
   determining whether said first and second features are in different groups based upon said comparison step; and
   accepting said second feature if said first and second features are in different groups.

8. The method as recited in claim 4, wherein said second step of grouping features comprises the steps of:
   logically AND'ing said numerical values assigned to a third class of feature elements of said second feature with said numerical values assigned to said third class of feature elements of said first feature;
   summing the results of said AND'ing step;
   comparing said summed result to a predetermined value to determine whether said first and second features are in different groups; and accepting said second feature if said first and second features are in different groups.

9. The method as recited in claim 4, wherein said step of determining the behavior of said first and second features comprises the steps of:
- multiplying said numerical values assigned to a fourth class of feature elements of said second feature with said numerical values assigned to said fourth class of feature elements of said first feature;
- summing the results of said multiplying step;
- comparing said summed result to a predetermined value to determine whether said first and second features have non-conflicting behaviors; and
- accepting said second feature if said first and second features have on-conflicting behaviors.

10. The method as recited in claim 9, wherein said step of determining the behavior of said first and second features further comprises the step of detecting a status of a current telephone call in said telephone switching system.

11. The method as recited in claim 4, wherein said step of prioritizing said first and second features comprises the steps of:
- computing a priority value for each of said first and second features by expanding said numerical values assigned to said feature elements of a fifth class for each of said first and second features;
- subtracting said priority value of said first feature from said priority value of said second feature;
- classifying said first feature as being of higher priority and accepting said first feature if said subtraction result is greater than zero;
- classifying said first feature as being of lower priority and accepting said second feature if said subtraction result is less than zero; and
- classifying said first feature and said second feature as being of equal priority and rejecting both said first and second features if said subtraction result equals zero.

12. A method of managing feature interactions in a telephone switching system which is capable of implementing a plurality of features, said method comprising the steps of:
a) identifying potential interactions between said plurality of features by performing operations on numerical values assigned to feature elements of said plurality of features;
b) resolving all of said potential interactions; and
c) controlling said switching system in response to said identifying and resolving steps by implementing only features which do not interact.

13. A feature interaction arbitrator for managing feature interactions in a telephone switching system which is capable of implementing a plurality of features, each of which are defined by classes of feature elements, said arbitrator comprising:
- a memory for storing a plurality of numerical values assigned to said feature elements for each of said plurality of features,
  each said plurality of numerical values representing properties and characteristics of a respective one of said plurality of features;
- identification means for identifying a potential interaction between first and second features based on a comparison of said numerical values assigned to said feature elements of said second feature with said numerical values assigned to said feature elements of said first feature; and
- a controller, responsive to an output of said identification means, for controlling said switching system so as to avoid said potential interaction between said first and second features.

14. The feature interaction arbitrator as recited in claim 13, wherein said identification means comprises:
a) a multi-stage data comparator for identifying said potential interaction between said first and second features, comprising
- line type means comprising a first stage circuit for identifying system restrictions between a line type and said first and second features,
- grouping means comprising second and third stage circuits, responsive to an output of said line type means, for grouping said first and second features according to their type of origination, redirection, and termination, and according to the resources used by said first and second features,
- behavior means comprising a fourth stage circuit, responsive to an output of said grouping means, for identifying whether the behavior of said first and second features conflict, and
- prioritizing means comprising a fifth stage circuit, responsive to an output of said behavior means, for prioritizing said first and second features; and
b) ar arbitrating circuit, responsive to outputs of said multi-stage data comparator, for resolving interactions identified by said multi-stage data comparator.

15. The feature interaction arbitrator as recited in claim 14, wherein said fourth stage circuit is further responsive to a status of a telephone call in said switching system.

16. The feature interaction arbitrator as recited in claim 14, wherein said first stage circuit comprises an exclusive-OR circuit for exclusive-OR'ing said numerical values assigned to a first class of said feature elements of said second feature with said numerical values assigned to said first class of said feature elements of said first feature.

17. The feature interaction arbitrator as recited in claim 14, wherein said second stage circuit comprises:
a memory storing a look-up table comprising predetermined numerical values to compare with said numerical values assigned to said feature elements of a second class for each of said first and second features.

18. The feature interaction arbitrator as recited in claim 14, wherein said third stage circuit comprises an AND circuit for logically AND'ing said numerical values assigned to a third class of said feature elements of said second feature with said numerical values assigned to said third class of said feature elements of said first feature.

19. The feature interaction arbitrator as recited in claim 14, wherein said fourth stage circuit comprises means for multiplying said numerical values assigned to a fourth class of said feature elements of said second feature with said numerical values assigned to said fourth class of said feature elements of said first feature.

20. The feature interaction arbitrator as recited in claim 14, wherein said fifth stage circuit comprises:
- an expander for expanding said numerical values assigned to said feature elements of a fifth class for each of said first and second features according to a predetermined formula; and
- a subtractor for subtracting said expanded numerical values of said first and second features.

* * * * *

UNITED STATES PATENT AND TRADEMARK OFFICE
CERTIFICATE OF CORRECTION

PATENT NO. : 5,337,351
DATED : August 9, 1994
INVENTOR(S) : Hisashi Manabe

It is certified that error appears in the above-identified patent and that said Letters Patent is hereby corrected as shown below:

Column 8, line 63, delete "I11", and insert --III--;

Column 11, row "MULTI-LINE HUNTING", delete "mult-line", and insert --multi-line--;

Column 11, row "NUMBER RESTRICTION", delete "restrictuion", and insert --restriction--;

Column 14, line 4, delete "$[E(2)]x10^{N-1}$", and insert --$[E(2)]x10^{N-2}$--;

Column 18, line 23, delete "ifs aid", and insert --if said--;

Column 19, line 15, delete "on", and insert --non--;

Column 20, line 26, delete "ar", and insert --an--.

Signed and Sealed this

Twenty-second Day of November, 1994

Attest:

BRUCE LEHMAN

Attesting Officer

Commissioner of Patents and Trademarks